(12) United States Patent
Richard et al.

(10) Patent No.: US 7,188,857 B2
(45) Date of Patent: Mar. 13, 2007

(54) TRANSFORMABLE UTILITY/ATV TRAILER

(76) Inventors: Robert Andre Richard, 7 Cliff Street, Quispamsis New Brunswick (CA) E2G 1Y4; Andre Marc Richard, 28 Murielle Crescent, Dieppe New Brunswick (CA) E1A 7R3

( * ) Notice: Subject to any disclaimer, the term of this patent is extended or adjusted under 35 U.S.C. 154(b) by 165 days.

(21) Appl. No.: 10/991,310

(22) Filed: Nov. 17, 2004

(65) Prior Publication Data
US 2005/0104324 A1    May 19, 2005

Related U.S. Application Data

(60) Provisional application No. 60/520,296, filed on Nov. 17, 2003.

(51) Int. Cl.
*B60D 1/07* (2006.01)
*B60D 1/54* (2006.01)
*B60D 1/155* (2006.01)

(52) U.S. Cl. ............... 280/482; 280/415.1; 280/491.1; 280/656

(58) Field of Classification Search ............. 280/491.1, 280/491.3, 491.5, 415.1, 416.1, 482, 656
See application file for complete search history.

(56) References Cited

U.S. PATENT DOCUMENTS

| | | | |
|---|---|---|---|
| 1,422,129 A | 7/1922 | Reuse | |
| 1,649,084 A | 11/1927 | Sandberg | |
| 2,174,468 A | 9/1939 | Kratfel | |
| 2,307,472 A * | 1/1943 | Shuey | 280/491.1 |
| 2,481,685 A | 9/1949 | Rogers | |
| 2,872,213 A * | 2/1959 | Hosford | 280/416.1 |
| 3,829,131 A | 8/1974 | Moore, Jr. | |
| 4,407,519 A * | 10/1983 | Heyser | 280/482 |
| 5,722,678 A | 3/1998 | Hunger | |
| 6,302,425 B1 | 10/2001 | Springer | |
| 6,857,650 B2 * | 2/2005 | Ward | 280/491.3 |

FOREIGN PATENT DOCUMENTS

DE          7332914          12/1973

* cited by examiner

*Primary Examiner*—Lesley D. Morris
*Assistant Examiner*—Marc A. Scharich
(74) *Attorney, Agent, or Firm*—Schmeiser, Olsen & Watts

(57) ABSTRACT

The present invention relates to a transformable utility/ATV trailer (1) that can easily be adapted to mount to a large number of different types of vehicles and trailer hitches. Moreover, the trailer (3) can rapidly be converted from a short box/bed trailer (3) to a flat bed trailer (3). The tow structure (2) comprises a frame (4) for mounting to a trailer (3) or similar implement and a draw bar (5) having a first end with a first hitch coupler (6) and a second end with a second hitch coupler (12). The draw bar (5) is mounted pivotally to the frame (4) for movement between a first position in which the first end of the draw bar (5) extends forward of the frame (4), and a second position in which the second end of the draw bar (5) extends forward of the frame (4).

24 Claims, 7 Drawing Sheets

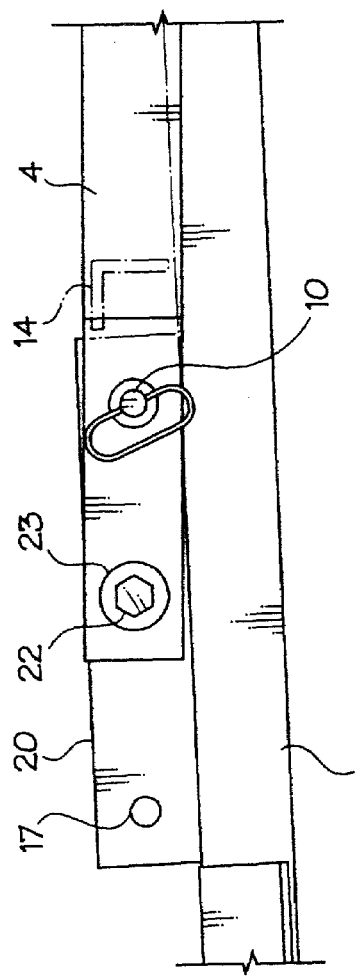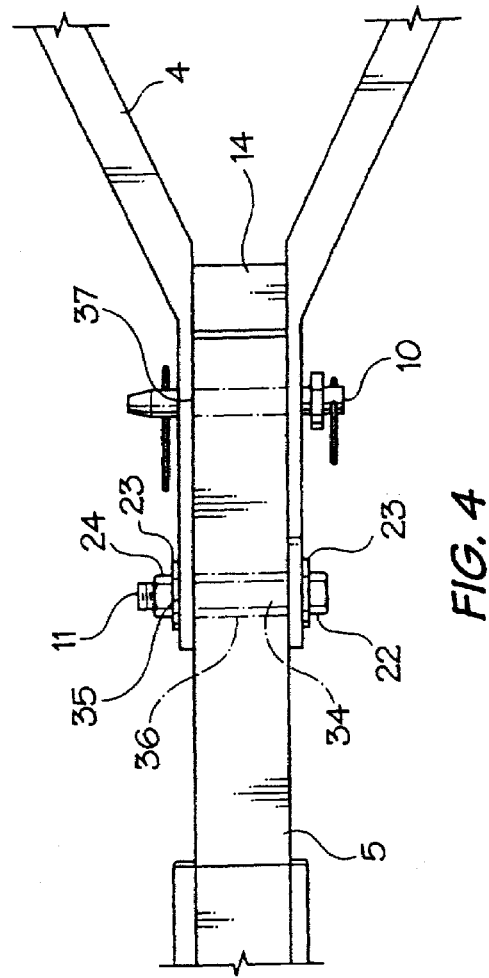

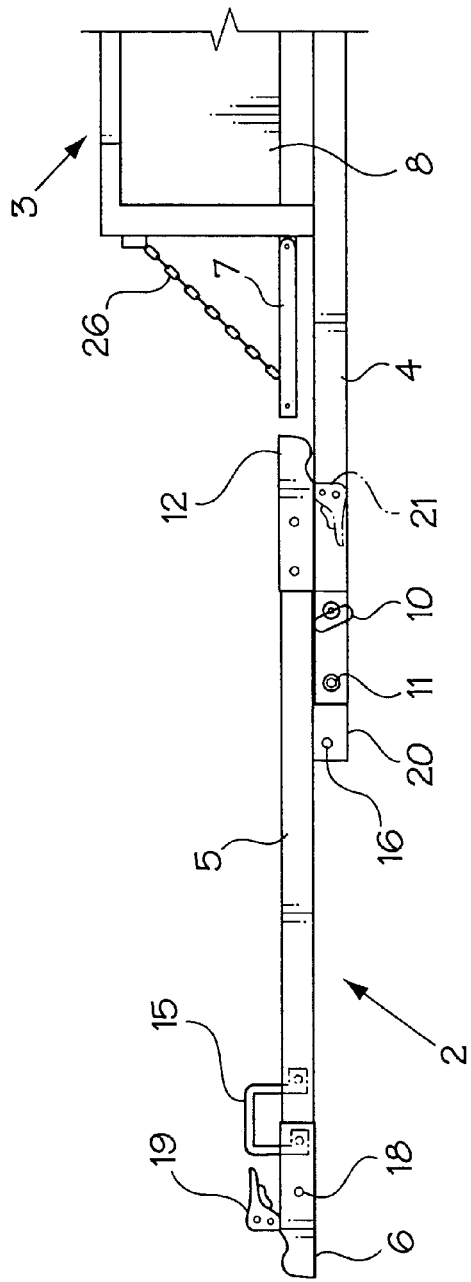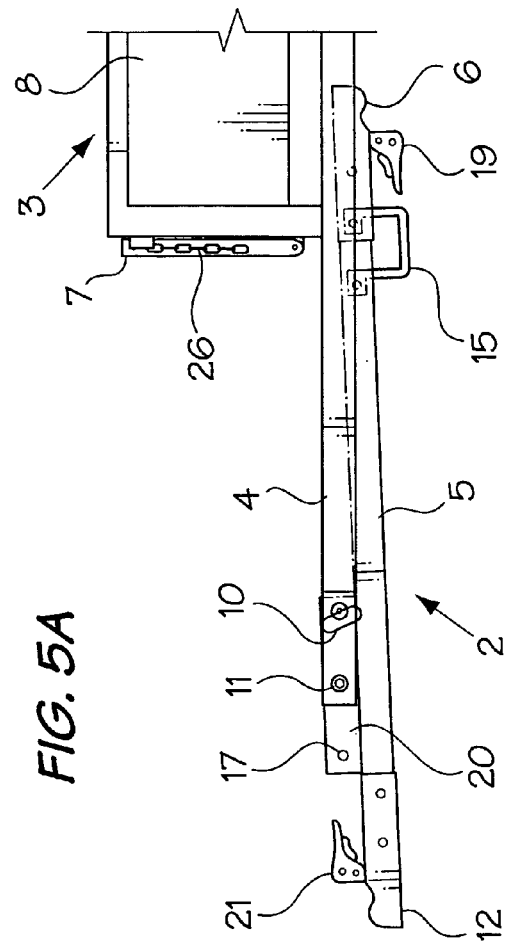

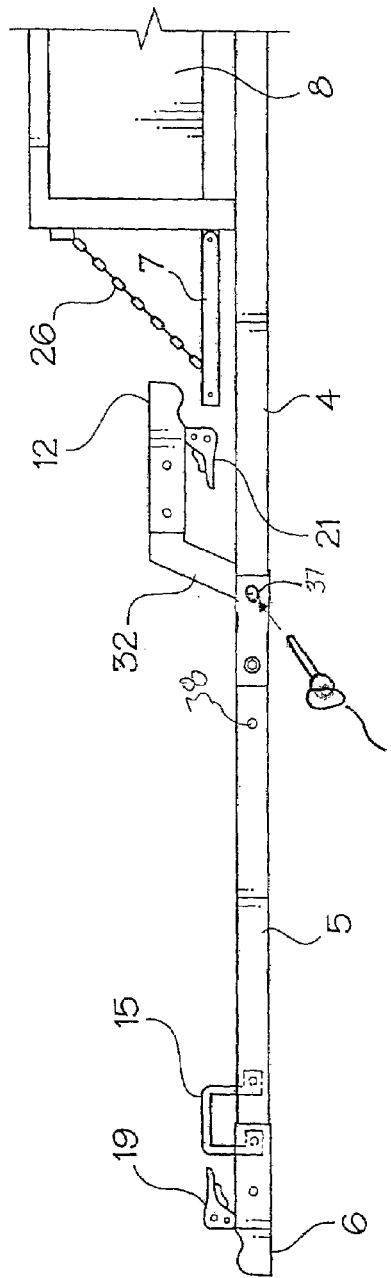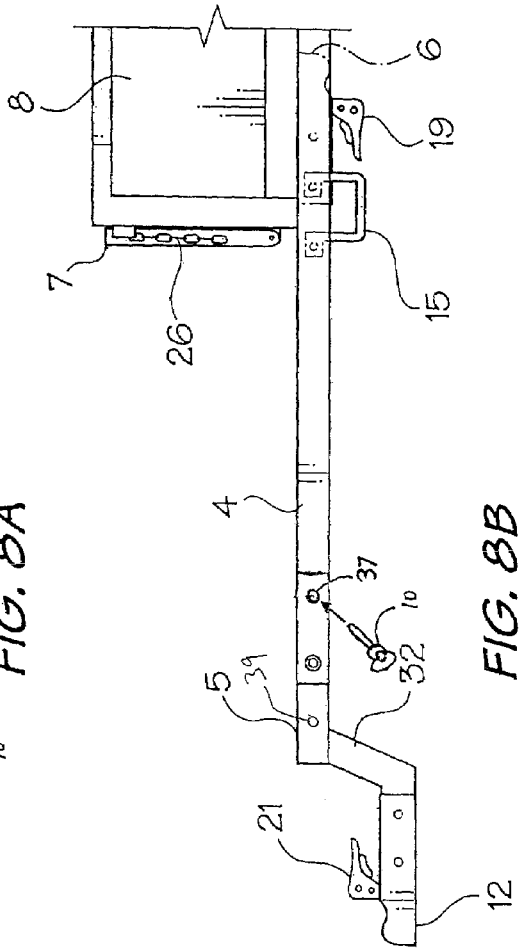

TRANSFORMABLE UTILITY/ATV TRAILER

RELATED APPLICATION

The present invention claims priority to U.S. Provisional Applicatation No. 60/520,296, filed Nov. 17, 2003, which is incorporated herein by reference in its entirety.

FIELD OF THE INVENTION

The present invention relates, generally, to an improved utility/ATV trailer. More specifically, the present invention relates to a transformable utility/ATV trailer that can be adapted to mount to a large number of different types of vehicles and trailer hitches and can easily be converted from a short box/bed trailer to a flat bed trailer.

BACKGROUND OF THE INVENTION

Typically, trailers are designed to be used for one type of hauling and mounted to a certain type of vehicle. For example, trailers that are mounted to ATVs usually have a short distance between the trailer and the vehicle, to maximize maneuverability in confined spaces and minimize the amount of travel in the trailer when in operation. However, a short distance between the trailer and the vehicle is not ideal for hauling a load on paved or maintained roadways, since it is more difficult to maneuver the trailer, especially when operating the vehicle in reverse. Moreover, the height of a hitch on a vehicle may vary from vehicle to vehicle, thus requiring a trailer with a hitch coupler positioned at a corresponding height. This is particularly problematic when a single trailer is to be used for hauling behind both a lawn tractor and a full-sized pickup truck. Therefore, individuals who own full-sized vehicles as well as ATVs and use both for hauling often have at least two trailers to suit the individual requirements of each vehicle.

The concept of providing adaptable trailers or tow bars is well known in the art. U.S. Pat. Nos. 1,649,084; 2,174,468 and 2,481,685 all teach of tow bars that are compact for easy storage and transportation that can be extended when required. Furthermore, U.S. Pat. No. 3,829,131 teaches of a aircraft tow bar that can folded for compact storage purposes. However, none of these devices can be used in their compact configuration for towing purposes.

U.S. Pat. No. 1,422,129 teaches of a wishbone tow bar attached to a farm implement which is transformable from a short configuration, ideal for towing behind a tractor, to a longer configuration suitable for connecting to horse or some form of large animal. The wishbone tow bar described in this patent document cannot be attached for use on conventional single point hitches.

U.S. Pat. No. 1,422,129 teaches of a wishbone tractor coupling attached to a farm implement which is transformable from a short configuration, ideal for towing behind a tractor, to a longer configuration suitable for connecting to horse or some form of large animal. The wishbone tractor coupling described in this patent document cannot be attached for use on conventional single point hitches.

U.S. Pat. Nos. 5,722,678 and 6,302,425 both describe convertible trailer coupling devices. U.S. Pat. No. 5,722,678 teaches of a coupling device with two hitch eyes of different diameters attached to the ends of a draw bar, which can be pivoted about a vertical axis in a horizontal plane. The distance between the pivot axis and the ends of the draw bar are equally spaced. U.S. Pat. No. 6,302,425 teaches of a trailer with a tongue with two couplers of different length. The short tongue is stationary, whereas the long tow bar pivots about a vertical axis in a horizontal plane. The long tongue is secured along the side of the trailer when not in use.

German Patent No. 7332914 teaches of a convertible tongue and coupler for providing different distances between the body of the trailer and the vehicle. The length of the tongue can be converted from a short configuration to a long configuration by pivoting in a vertical plane about a horizontal axis provided in a frame, so that the tongue lies in a plane fixed by the frame. This configuration of the tongue does not allow for the trailer to be coupled to different vehicles with varying hitch heights. Moreover, German Patent No. 7332914 teaches the use of only hitch eyes as the hitch couplers.

SUMMARY OF THE INVENTION

It is an object of the present invention to provide a transformable utility/ATV trailer, which can be adapted to be mounted to various types of vehicles and can be used to haul various sized structures and compositions.

According to one aspect of the present invention, there is provided a tow structure comprising a frame for mounting to a vehicle or a trailer, and a tongue having a first end with a first hitch coupler and a second end with a second hitch coupler, the tongue mounted pivotally to the frame for movement between a first position in which the first end of the tongue extends forward of the frame, and a second position in which the second end of the tongue extends forward of the frame to form an angle with the frame, wherein the tongue has a pivot axis disposed intermediate to the first and second ends and the frame has a pivot axis which is coaxial with the pivot axis of the tongue and essentially horizontal to allow the tongue to pivot in a substantially vertical plane.

According to a second aspect of the present invention, there is provided a tow structure comprising a frame for mounting to a vehicle or a trailer, and a tongue having a first end with a first hitch coupler and a second end with a second hitch coupler wherein an angle is formed along the tongue in the vicinity of the second end, the tongue mounted pivotally to the frame for movement between a first position in which the first end of the tongue extends forward of the frame, and a second position in which the second end of the tongue extends forward of and substantially parallel to the frame in a plane generally below the plane defined by the frame, wherein the tongue has a pivot axis disposed intermediate to the first and second ends and the frame has a pivot axis which is coaxial with the pivot axis of the tongue and essentially horizontal to allow the tongue to pivot in a substantially vertical plane.

According to a third aspect of the present invention, there is provided a trailer having a tow structure as described above attached thereon.

BRIEF DESCRIPTION OF THE DRAWINGS

FIG. 3 A side view of the tow structure shown in FIG. 2 in the vicinity of the pivot axis;

FIG. 4 A top plan view of the tow structure shown in FIG. 3;

FIG. 5 A) Side views of the tow structure shown in FIG. 2 in the first rosition;

Figure 2:
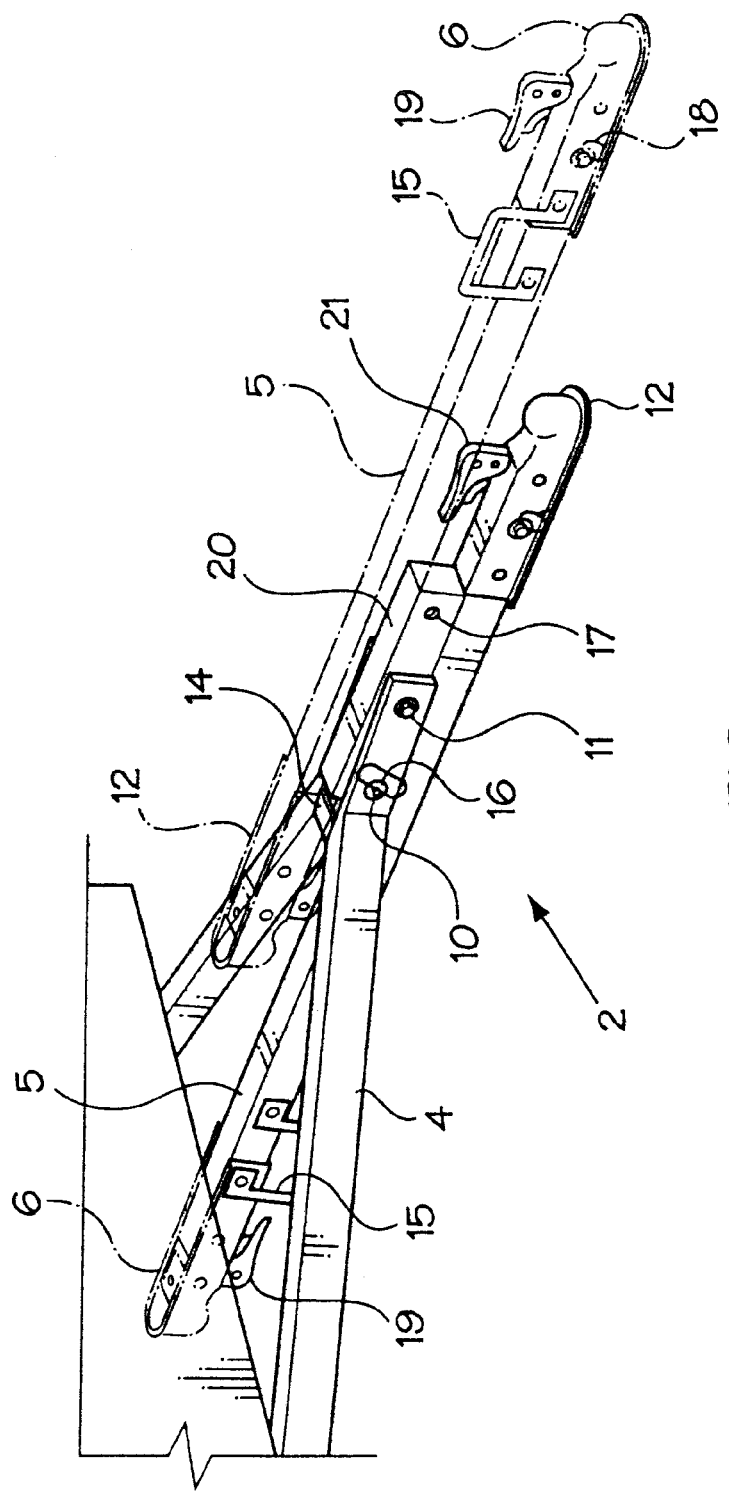
FIG. 2 A perspective view of a tow structure according to an embodiment of the present invention.
Figure 6:
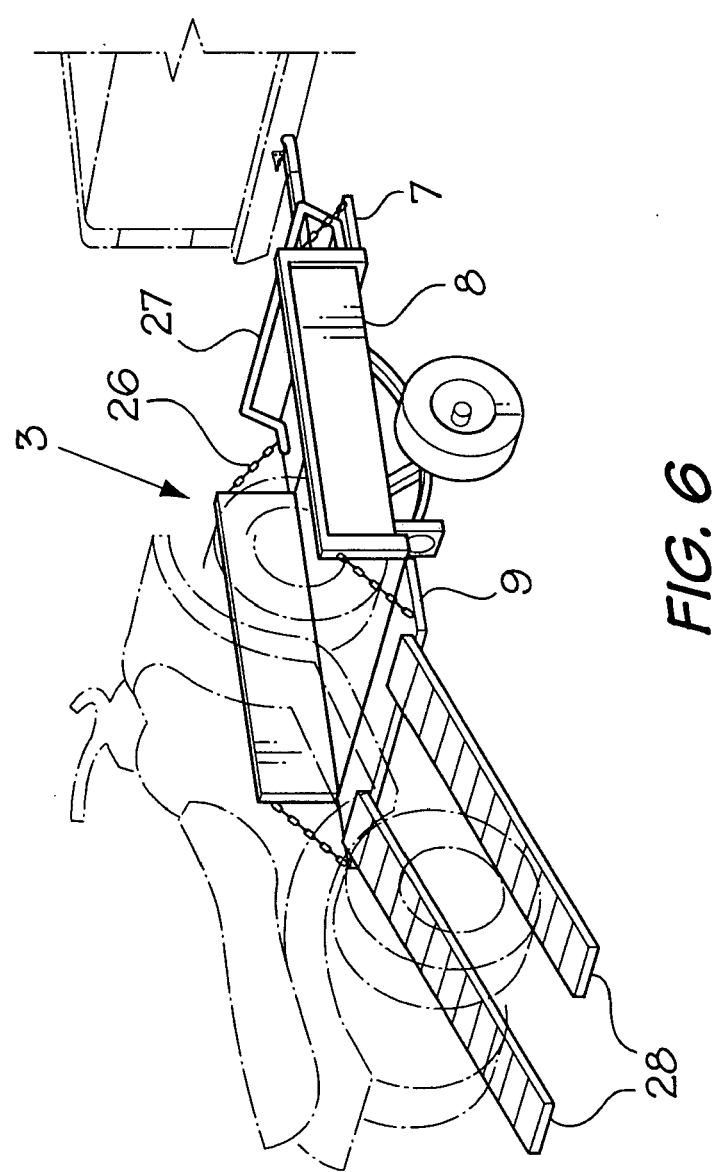
Figure 7:
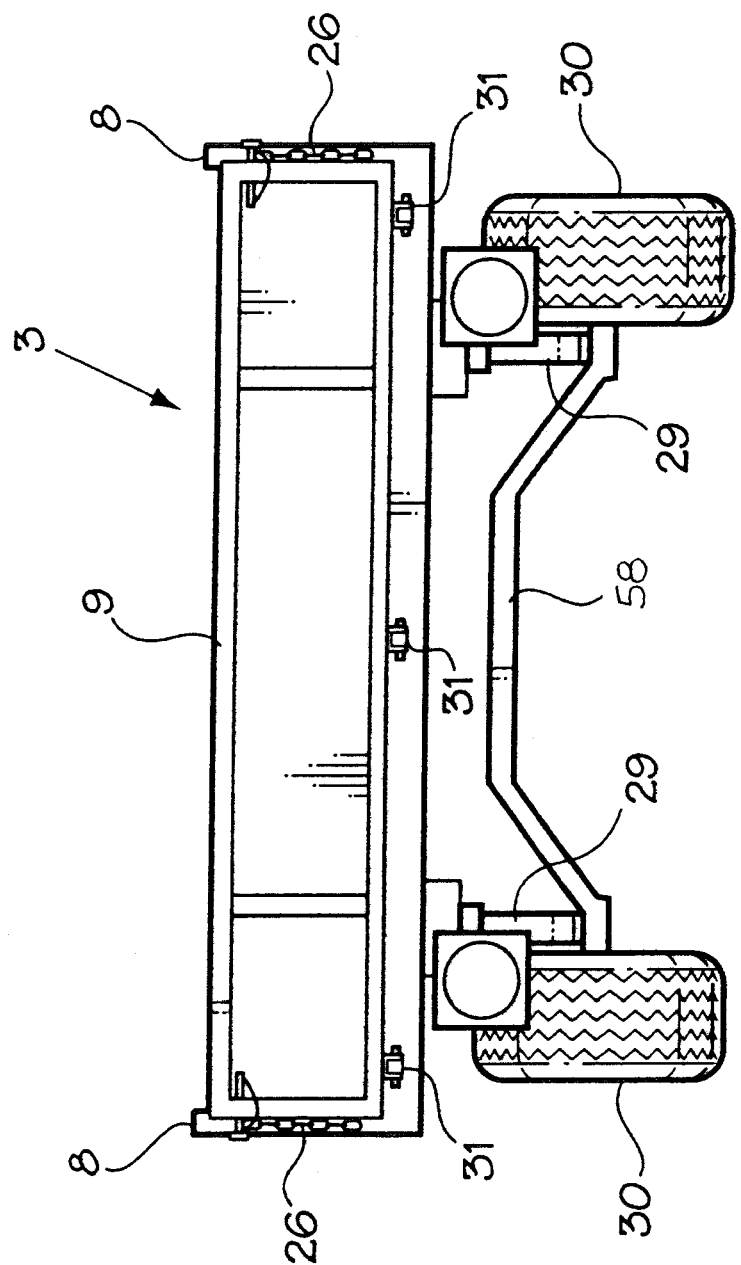

B) Side view of the tow structure shown in FIG. 2 in the second rosition.;

FIG. 6 A perspective view of a trailer according to an embodiment of the present invention;

FIG. 7 A back view of a trailer according to an embodiment of the present invention; and FIG. 8 A) A Side views of a tow structure in the first position according to an embodiment of the present invention; B) A side view of a tow structure in the second rosition according to an embodiment of the present invention.

DETAILED DESCRIPTION OF THE INVENTION

Other applications and configurations may be envisioned for the transformable utility/ATV trailer of the present invention, such as using the tongue in the second position with the gates on the trailer open or the tongue in the first position with the gates on the trailer closed. Accordingly, without intending to limit the present invention to the embodiments described herein, the invention will be described below in further detail having regard to the transformable utility/ATV trailer shown in FIGS. 1 to 8.

Figure 1:
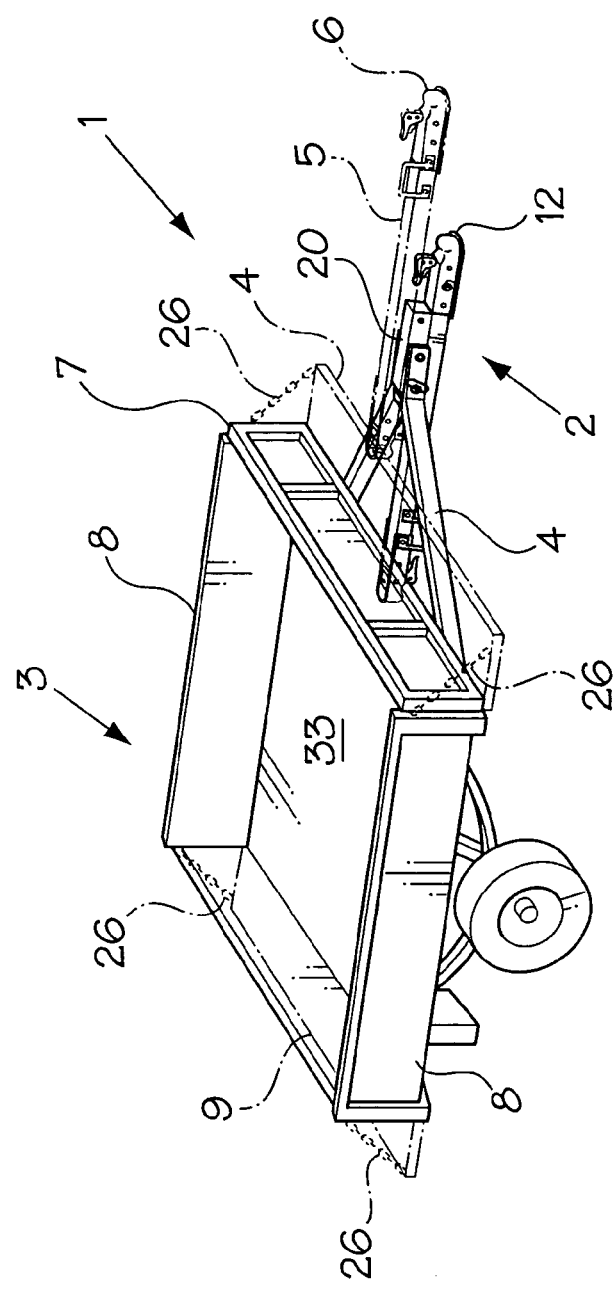
FIG. 1 A perspective view of the transformable utility/ATV trailer of the present invention.

FIG. 1 shows a transformable utility/ATV trailer according to an embodiment of the present invention. The transformable utility/ATV trailer 1 comprises a trailer 3 with a tow structure 2 mounted thereon. The tow structure 2 comprises a frame 4 for mounting to a vehicle or trailer 3, and a tongue 5 having a first end with a first hitch coupler 6 and a second end with a second hitch coupler 12 (FIG. 2). According to an embodiment of the present invention, the tongue 5 is mounted pivotally to the frame 4 for movement between a first position, in which the first end of the tongue 5 extends forward of the frame 4 in a plane defined by the frame (FIG. 5A), and a second position in which the second end of the tongue 5 extends forward of the frame 4 to form an angle with the frame (FIG. 5B). The tongue 5 has a pivot axis 34 disposed intermediate to the first and second ends and the frame 4 has a pivot axis 35 which is coaxial with the pivot axis 34 of the tongue 5 and essentially horizontal to allow the tongue 5 to pivot in a substantially vertical plane.

According to an embodiment of the present invention, a support member 20 is disposed on the tongue 5 in a position off the middle of a length of the tongue 5. The support member 20 is mounted pivotally to the frame 4 for movement between a first position in which the first end of the tongue 5 extends forward of the frame 4 in a plane substantially parallel to the frame 4 (FIG. 5A), and a second position in which the second end of the tongue 5 extends forward of the frame 4 to form an angle with the frame 4 (FIG. 5B). The tongue 5 is pivoted between the first position and the second position through a pivot axis 34, which is bored through the support member 20, intermediate to the first and second ends of the tongue 5, corresponding to a pivot axis 35, which is coaxial with the pivot axis 34 of the support member 20 (FIG. 4).

Preferably, the pivot axis 34 on the support member 20 or tongue 5 is disposed off the middle of a length of the tongue 5 resulting in the distance between the pivot axis 34 and first end of the tongue 5 being different than the distance between the pivot axis 34 and the second end of the tongue 5. In particular, the distance between the pivot axis 34 and the first end of the tongue 5 is substantially greater than the distance between the pivot axis 34 and the second end of the tongue 5 (FIG. 2). However, the pivot axis 34 on the support member 20 or tongue 5 can be disposed centrally along a length of the tongue 5 resulting in the distance between the pivot axis 34 and first end of the tongue 5 being the same as the distance between the pivot axis 34 and the second end of the tongue 5. The channels 16, 17 and pivot axis 34 define a generally longitudinal axis, wherein the channel 16 can be provided at a position offset from the axis. The pivot axis 34 on the support member 20 or tongue 5 consists of a channel, dimensioned to receive a pivot pin 11, bored through the width of the tongue 5. Preferably, the channel will contain a spacer sleeve 36, which is substantially greater in diameter than the diameter of the pivot pin 11, to prevent excessive wear on the channel (FIG. 4). The pivot axis 35 on the frame 4 consists of two holes which are in substantial horizontal alignment. Moreover, the spacer sleeve 36 is dimensioned to be of a substantially greater diameter than the two holes provided on the frame 4, and of sufficient length to keep the distance between the two arms of the frame constant, even when the pivot pin 11 is tightened.

The pivot axis 34 on the support member 20 or tongue 5 is connected to the pivot axis 35 on the frame by a pivot pin 11 (FIGS. 3 and 4). Typically, the pivot pin 11 is comprised of a bolt 22 held in place by washers 23 and a nut 24. However, any means capable of securing the coupling of two articles can be used as the pivot pin 11.

The tongue 5 can be pivoted and secured into the first position by a hitch pin 10, which is inserted through an opening 37 in the frame 4 and channel 17 in the support member 20 or tongue 5 when the opening 37 and the channel 17 are aligned. Vertical movement of the tongue 5 in the first position is further limited by a frame cross brace 14 provided between the two frame 4 members (FIGS. 3 and 4). Another function of the frame cross brace 14 is to support the frame 4 in an A-frame configuration. The tongue 5 rests on the uppermost side of the cross-brace 14 to prevent downward movement of the tongue 5 in the first position. As shown in FIG. 5A, when the tongue 5 is in the first position, coupler 6 is positioned to attach to a hitch or hitch mount on a vehicle, whereas, coupler 12 is upwardly facing. When the tongue 5 is in the first position the distance between trailer 3 and the hitch on the vehicle is of substantial length and the distance between the tongue 5 and the ground is of substantial height for on road use. Typically, when the tongue 5 is in the first position the trailer can be mounted to any type of vehicle including an automobile, pick-up truck, sport-utility vehicle, ATV, or farm or lawn tractor.

To pivot the tongue 5 from the first position to the second position, the hitch pin 10 is removed from the frame 4 and support member 20 or tongue 5, and through the use of an optional handle 15, the tongue 5 is pivoted in a substantially vertical plane, using the horizontal pivot axis 34, 35 as a reference (FIG. 1). Alternatively, the construction of the frame 4 and the tongue 5 can be such that the pivot axes 34, 35 define a vertical axis and the tongue 5 pivots in a horizontal plane. The optional handle 15 is also provided to protect the hitch coupler 6 and latching mechanism 19 from damage, when the tongue 5 is in the second position and the hitch coupler 6 is tucked underneath the cargo bed 33. Furthermore, the hitch pin 10 can be replaced with a spring loaded latching system. In the second position, the tongue 5 is provided at an angle to the frame 4, as a result of channel 16 being offset from the substantially longitudinal axis of channel 17 and pivot axis 34 (FIG. 5B). The tongue 5 is secured in the second position by a hitch pin 10, which is inserted through an opening 37 in the frame 4 and channel 16 in the support member 20 or tongue 5 when the opening 37 and the channel 16 are aligned. Vertical movement of the tongue 5 in the first position is further prevented by the frame cross brace 14 (FIGS. 3 and 4). The tongue 5 rests on the lowermost side of the cross-brace 14 to prevent upward movement of the tongue 5 in the second position. As shown in FIG. 5B, when the tongue 5 is in the second position coupler 12 is positioned to be mounted to the hitch or hitch mount on the vehicle, whereas, coupler 6 is upwardly facing. When the tongue 5 is in the second position the distance between the trailer 3 and the hitch on the vehicle is of substantial length and the distance between the tongue 5 and the ground is of substantial height for on or off road use. Typically, when the tongue 5 is in the second position the trailer can be mounted to a farm or recreational vehicle such as an farm or lawn tractor, ATV or full-sized vehicle such as an automobile or truck.

As an alternate embodiments of the present invention, an angle 32 is formed along the tongue 5 in the vicinity of the coupler 12 (FIG. 8A and 8B). The angle 32 is provided along the tongue 5 between the pivot axis 34 formed in the support member 20 or the pivot axis formed in the tongue 5 and the coupler 12. When the angle 32 is provided in conjunction with the support member 20, the tongue 5 pivots from a first position in which the first end of the tongue 5 extends forward of the frame 4 in a plane substantially parallel to the frame 4, and a second position in which the second end of the tongue 5 extends forward of and substantially parallel to the frame 4 in a plane generally below the plane defined by the frame 4. When the angle 32 is formed along the tongue 5 in the absence of the support member 20, the tongue 5 pivots from a first position in which the first end of the tongue 5 extends forward of the frame 4 in a plane defined by the frame 4, and a second position in which the second end of the tongue 5 extends forward of and substantially parallel to the frame 4 in a plane generally below the plane defined by the frame 4 (FIG. 8B).

When the tongue 5 is in the second position the coupler 12 can be mounted to the hitch of a vehicle, which is substantially lower to the ground than provided in the first embodiment of the present invention. In addition, the use of the tongue 5 with the angle 32 can allow for larger diameter tires 30 to be used on the trailer 3 and yet still couple to a hitch on a vehicle positioned at a conventional height from the ground. The tongue 5 is secured into place by a hitch pin 10, which is inserted through opening 37 in the frame 4 and channel 38 provided in the tongue 5. Similar to the first embodiment, the tongue 5 is pivoted in a substantially vertical plane from the second position to the first position. The tongue 5 is secured in the first position by a hitch pin 10 inserted through opening 37 in the frame 4 and channel 39 provided in the tongue 5.

Typically, the frame 4 and tongue 5 are provided as the same material, however each can be provided as a distinct material. Suitable materials for the frame 4 and tongue 5 include any durable or resilient material such as plastic, steel, carbon-fibre, stainless steel, or other alloys, such as aluminum or titanium. As an alternate embodiment of the present invention, the A-frame can be replaced by a frame 4 which is configured with one or two straight, longitudinal frame members extending from the pivot axis 35 to the trailer 3.

Typically, the couplers 6, 12 are the same type, for example ball hitch couplers, however each coupler 6, 12 can be provided as a different type of coupler. Latches 19, 21 are provided on the couplers 6, 12, respectively, to secure the coupler onto the ball hitch. Moreover, coupling orifices 18 are provided in each coupler 6, 12 to secure the safety chain hooks from the vehicle.

The frame 4 is attached to a trailer 3, which can be configured in several different ways based on the cargo that is to be hauled (FIG. 1). In a first configuration, a front gate 7 and rear gate 9 can both be provided an upright position wherein the gates 7, 9 are substantially perpendicular to the cargo bed 33, so that the front gate 7, rear gate 9 and side members 8 enclose the cargo bed 33. This configuration can ideally be used to transport loose materials, such as soil, rocks, bricks, sand, as well as outdoor gear and tools. Moreover, depending on the type of tongue 5 used, the trailer can be attached to any type of vehicle that contains a hitch. According to a second configuration of the trailer, the front gate 7 and rear gate 9 are provided in a down position wherein the gates 7, 9 are substantially in the same plane as the cargo bed 33, so that only the side members 8 are perpendicular to the cargo bed 33. This configuration allows for any longer article to be transported, including lumber, boats, canoes, kayaks, lawn tractors and ATVs. In addition, any combination of rear gate 9 upright and front gate 7 down or rear gate 9 down and front gate 7 upright can be used to customize the trailer 3 to suit the needs of the load being hauled.

Both the front gate 7 and rear gate 9 are pivotably connected at one end to the trailer by connection means 31 (FIG. 7). The connection means 31 are typically conventional hinges, however limited rotation hinges can also be used in lieu of linkage means to support either the front gate 7 or rear gate 9 in the down position. Typically, in order to support the gates 7,9 in the down position, linkage means 26 are provided connecting the opposite end of the gates 7, 9 to the side members 8. The linkage means 26 can consist of heavy-duty chains, aircraft cable, wire rope or the like.

The supporting structures for the trailer 3 are typically similar to those found on conventional trailers, however, the trailer 3 of the present invention can be provided with several features to assist in its operability over rough terrain (FIG. 7). First, a high clearance axle 58 can be provided, wherein the middle section of the axle is angled toward the cargo bed to a position below the cargo bed 33, which allows for the trailer to transverse terrain that may contain out croppings. Moreover, dual axles can be provided as either conventional axle structures or as high clearance axles 58. A leaf spring suspension 29 may also be provided to limit vertical movement of the trailer 3 over the terrain. Furthermore, the tires 30 can be adapted to the terrain in which the trailer is going to travel on. For example, the trailer 3 can be fitted with small diameter tires 30, which provides a lower cargo bed 33 with greater utility for loading and unloading cargo, and a smoother ride on pavement or maintained roadways. Conversely, large diameter tires 30 can be provided to better transverse rough terrain, such as mud and snow. Moreover, the cargo bed 33 can be provided to be tilted. Typically, the cargo bed 33 can be tilted by means of a pivot axis generally parallel to and above the axle 58 of the trailer 3. This allows the cargo bed 33 to be tilted to facilitate the removal and dumping of cargo.

As a further embodiment of the present invention, at least one positive lock light weight ramp 28 can be provided, with each ramp 28 being attached at one end to the rear gate 9 when the gate 9 is in the down position (FIG. 6). The other end of each ramp 28 contacts the ground to allow for an ATV or similar vehicle to be moved onto the trailer 3. Furthermore, a vehicle wheel stop attachment 27 can be provided on the front gate 7, to prevent the forward movement of the cargo or the vehicle, beyond the front gate 7 when the front gate 7 is in the first position. Alternatively, a vehicle wheel stop attachment 27 can also be provided on the rear gate 9, so that large vehicles, such as 6-wheel all-terrain vehicles, can be hauled with both gates 7, 9 in general alignment with the horizontal plane defined by the cargo bed 33.

We claim:

1. A tow structure comprising:
   a frame for mounting to a trailer, and
   a tongue having a first end with a first hitch coupler and a second end with a second hitch coupler, the tongue mounted pivotally to the frame for movement between a first position in which the first end of the tongue extends forward of the frame, and a second position in which the second end of the tongue extends forward of the frame
   wherein the tongue has a pivot axis disposed intermediate to the first and second ends and the frame has a pivot axis which is coaxial with the pivot axis of the tongue and essentially horizontal to allow the tongue to pivot in a substantially vertical plane.

2. The tow structure according to claim 1, wherein the first end of the tongue extends forward of the frame in a plane defined by the frame in the first position.

3. The tow structure according to claim 1, further comprising a support member disposed on the tongue, the support member having a pivot axis disposed intermediate to the first and second ends and the frame has a pivot axis which is coaxial with the pivot axis of the support member and positioned so that when the tongue is in the first position the first end of the tongue extends forward of the frame in a plane substantially parallel to the frame.

4. The tow structure according to claim 1, wherein the pivot axis on the tongue is positioned in a vicinity of the middle of a length of the tongue.

5. The tow structure according to claim 3, wherein the pivot axis on the support member is positioned in a vicinity of the middle of a length of the tongue.

6. The tow structure according to claim 1, further comprising means for immobilizing the tongue in the first position or the second position.

7. A tow structure comprising:
   a frame for mounting to a a trailer, and
   a tongue having a first end with a first hitch coupler and a second end with a second hitch coupler wherein an angle is formed along the tongue in a vicinity of the second end, the tongue mounted pivotally to the frame for movement between a first position in which the first end of the tongue extends forward of the frame, and a second position in which the second end of the tongue extends forward of and substantially parallel to the frame in a plane generally below a plane defined by the frame wherein the tongue has a pivot axis disposed intermediate to the first and second ends and the frame has a pivot axis which is coaxial with the pivot axis of the tongue and essentially horizontal to allow the tongue to pivot in a substantially vertical plane.

8. The tow structure according to claim 7, wherein the first end of the tongue extends forward of the frame in a plane defined by the frame in the first position.

9. The tow structure according to claim 7, further comprising a support member disposed on the tongue, the support member having a pivot axis disposed intermediate to the first and second ends and the frame has a pivot axis which is coaxial with the pivot axis of the support member and positioned so that when the tongue is in the first position the first end of the tongue extends forward of the frame in a plane substantially parallel to the frame.

10. The tow structure according to claim 7, wherein the pivot axis on the tongue is positioned in a vicinity of the middle of a length of the tongue.

11. The tow structure according to claim 9, wherein the pivot axis on the support member is positioned in a vicinity of the middle of a length of the tongue.

12. The tow structure according to claim 9, further comprising means for immobilizing the tongue in the first position or the second position.

13. A trailer having a tow structure according to claim 1 mounted thereon.

14. The trailer according to claim 13 comprising:
   a four-sided cargo bed disposed on an axle defining a generally horizontal plane wherein a front gate and a rear gate are connected to the cargo bed on opposite sides of the cargo bed and side members are disposed between the front and rear gates at a position substantially perpendicular to the cargo bed, wherein the front and rear gates are movable between a position substantially perpendicular to the cargo bed to a position in general alignment with the horizontal plane defined by the cargo bed.

15. The trailer according to claim 14, wherein the axle is a high clearance axle.

16. The trailer according to claim 14, wherein a pivot axis is provided between the cargo bed and the axle in a position substantially parallel to the axle, whereby the pivot axis is essentially horizontal to allow the cargo bed to pivot in a substantially vertical plane.

17. The trailer according to claim 14, wherein at least one positive lock ramp is attached at one end to the rear gate and the other end is positioned to engage a ground surface.

18. The trailer according to claim 14, wherein a wheel stop attachment is mounted to the front gate, rear gate or both to prevent forward or backward movement.

19. A trailer having a tow structure according to claim 7 mounted thereon.

20. The trailer according to claim 19 comprising:
   a four-sided cargo bed disposed on an axle defining a generally horizontal plane wherein a front gate and a rear gate are connected to the cargo bed on opposite sides of the cargo bed and side members are disposed between the front and rear gates at a position substantially perpendicular to the cargo bed, wherein the front and rear gates are movable between a position substantially perpendicular to the cargo bed to a position in general alignment with the horizontal plane defined by the cargo bed.

21. The trailer according to claim 20, wherein the axle is a high clearance axle.

22. The trailer according to claim 20, wherein a pivot axis is provided between the cargo bed and the axle in a position substantially parallel to the axle, whereby the pivot axis is essentially horizontal to allow the cargo bed to pivot in a substantially vertical plane.

23. The trailer according to claim 20, wherein at least one positive lock ramp is attached at one end to the rear gate and the other end is positioned to engage a ground surface.

24. The trailer according to claim 20, wherein a wheel stop attachment is mounted to the front gate, rear gate or both to prevent forward or backward movement.

* * * * *